UNITED STATES PATENT OFFICE.

ROBERT C. SCHÜPPHAUS, OF BROOKLYN, NEW YORK.

PYROXYLIN COMPOUND.

SPECIFICATION forming part of Letters Patent No. 598,648, dated February 8, 1898.

Application filed September 14, 1896. Serial No. 605,847. (No specimens.)

*To all whom it may concern:*

Be it known that I, ROBERT C. SCHÜPPHAUS, of Brooklyn, New York, have invented certain new and useful Improvements in and Relating to Pyroxylin Compounds and Substances Useful Therewith, of which the following is a specification.

The present invention contemplates improvements in the art of making various pyroxylin compounds and the improved pyroxylin compounds themselves.

The prime objects of the invention are to improve the manufacture of pyroxylin compounds, particularly viscous liquid and strong flexible solid compounds.

In my former patent of the United States No. 410,208, of September 3, 1889, I have pointed out the utility of the acetins—*i. e.*, the acetates or acetic esters of glycerol—in the manufacture of highly-viscous pyroxylin solutions and of solid compounds possessing great flexibility. I have, however, found that in atmospheres heavily charged with moisture these compounds may become covered with water, owing to the hygroscopic nature of the acetins.

The object of the present invention, at least so far as it relates to the finished product, is to combine in the pyroxylin compound great strength and flexibility with freedom from hygroscopic properties.

Heretofore it has been customary to add oils or oily substances to the pyroxylin where flexibility is desired. Thus the flexible collodion of the *United States Pharmacopœia* contains castor-oil mechanically mixed in the compound, and the collar-and-cuff pyroxylin-camphor compounds usually contain the same. Oils treated with sulfur are also used for certain purposes. I have discovered that if the oil, or other more or less viscous liquid to be used, is a solvent and therefore is far more intimately combined instead of being merely mechanically mixed with the pyroxylin far greater strength and toughness with equal or even greater flexibility is obtained. To the value and importance of these results must be added the great saving of other solvents, which are thus rendered wholly or largely unnecessary because my new class of substances for giving combined strength and flexibility are themselves solvents.

I have discovered that by introducing another acid radical into the acetins and allied substances the objectionable hygroscopic qualities will be absent without sacrifice of solvent powers. The mixed esters of glycerol so formed may be regarded as derivatives of glycerol in which the hydrogen atoms of two or of all three of the hydroxyl groups have been replaced by acid radicals.

When a current of hydrogen chlorid is passed through a mixture of equal volumes of glacial acetic acid and glycerol, heated to 100° centigrade, acetodichlorhydrin (two forms possible) probably of the composition $CH_2Cl$, $CHOCOCH_3$, $CH_2Cl$ (1 3 dichloro, 2 acetin) is formed; but this is at once in part saponified and dichlorhydrin (two possible forms) produced. Hence the technical article contains the latter. Its presence is not injurious, as it, too, possesses solvent properties. This acetochlorhydrin is not hygroscopic. It is more particularly valuable in its application to printing-inks for pyroxylin surfaces. It can hardly replace the oil in solid compounds, because, notwithstanding its high boiling-point, (205° centigrade,) it in time almost entirely evaporates.

I have modified the acetins, and these obviously may be replaced by closely-allied glycerol esters, by introducing the radicals of benzoic, oleic, and nitric acids, and I have found these new substances highly valuable.

Benzoated acetins I have prepared from glycerol monobenzoate, (monobenzoin,) which itself slowly dissolves pyroxylin and may be used with advantage in forming flexible compounds; but its solvent powers are greatly increased if one or two acetyl radicals are introduced into its constitution. These modified esters I have produced, respectively, by heating monobenzoin (monobenzoate of glycerol) with glacial acetic acid to obtain benzomonoacetin and with acetic anhydrid to obtain the benzodiacetin. Both are excellent non-hygroscopic solvents of pyroxylin and are practically non-volatile. Benzochlorhydrin obtained by acting with hydrogen chlorid upon a mixture of glycerol and benzoic acid is also a highly useful solvent of a similar constitution. (Glycerol with two different acid radicals.)

When acid radicals of very high molecular weight are introduced into the acetins, the solvent power is diminished. Thus monoolein (the monoöleate of glycerol) with acetic acid yields an acetate (acetin) that is practically inert. Even the diaceto product obtained with acetic anhydrid (oleodiacetin) merely softens soluble pyroxylin; but a solution of camphor and oleodiacetin exerts a decided solvent action. These oleoacetates or acetoleates of glycerol I believe have never before been formed. The nitroacetates are also valuable in certain fields. I have nitrated the monoacetins and diacetins with the ordinary mixed acids used for preparing nitroglycerol. The dinitromonoacetins and mononitrodiacetins which I have thus formed are solvents of pyroxylin at ordinary temperatures. Their chief value is in the manufacture of improved explosive gelatin. The explosive gelatin formed with their aid will not exude nitroglycerol even after freezing and thawing.

From the foregoing it will be seen that I have extended the field of usefulness of pyroxylin by discovering a manner of preparing flexible pyroxylin compounds of great strength. Such compounds may be used for a variety of purposes. Among others may be mentioned, for instance, fish-lines and substitutes for oil-silk, sheet rubber, &c., and it will be seen also that I have produced new substances, as described, for use either in this field or indeed elsewhere. The utilization of all this new class of pyroxylin solvents requires no material departure from the present established process of flowing comparatively thin solutions and of masticating partly-gelatined mixtures, and the solvents ordinarily used may be used in conjunction with these new solvents. The proportions to be added vary widely, however, according to the use for which the articles to be made from the compound are intended and according to the characteristics desired, and, moreover, well-known solvents may be used in conjunction with them.

Twenty-five parts, by weight, of solvent to one hundred parts of pyroxylin is amply sufficient for material to be worked up into collars and cuffs or articles of similar character; but a much larger quantity of these solvents may be incorporated in material to be used as substitutes for oil-silk, sheeting for dress-shields, and similar highly-flexible material. On the other hand a very small percentage may be used where only a slight decrease in hardness is desired. Thus it is possible by proportioning the amount used in this manner to attain any degree of toughness and flexibility and give to the finished material precisely the physical nature required for any of the multiplicity of uses where strength and flexibility are required.

I do not mean to limit myself to the manner of producing each of the solvents I have described, and, inasmuch as benzoacetins, for instance, may, at least theoretically, exist in seven variations I mean to include in each case where a substance is named all the variations generically described by such name. I am not prepared to state what substances are or are not the equivalents of the ones named.

I claim and desire to secure by these Letters Patent, together with such modifications as will be apparent to chemists familiar with pyroxylin compounds, the following:

1. The improvement in the manufacture of pyroxylin compounds which consists in incorporating with the pyroxylin one or more of the following esters of glycerol: monobenzoate of glycerol, benzochlorhydrin, dichlorhydrin, dichloroacetin, benzomonacetin, benzodiacetin; oleoacetin, oleodiacetin, dinitroacetin; mononitrodiacetin, to form strong flexible compounds, substantially as set forth.

2. The improvement in the manufacture of pyroxylin compounds, which consists in incorporating with pyroxylin a glycerol ester that contains the radicals of two different acids.

3. Pyroxylin composition containing one or more of the following glycerol derivatives: monobenzoate of glycerol, benzochlorhydrin, dichlorhydrin, dichloroacetin, benzomonacetin, benzodiacetin, oleoacetin, oleodiacetin, dinitroacetin, mononitrodiacetin.

4. Pyroxylin composition, containing a compound glycerol ester, which includes the radicals of different acids, substantially as set forth.

In testimony whereof I have hereunto set my hand this 20th day of August, 1896.

ROBERT C. SCHÜPPHAUS.

Witnesses:
   GEORGE H. SONNEBORN,
   HAROLD BINNEY.